United States Patent [19]

Ugon et al.

[11] Patent Number: 4,523,297
[45] Date of Patent: Jun. 11, 1985

[54] HAND-HELD PROCESSOR WITH TWO-WAY DIALOG BETWEEN MICROPROCESSOR IN CASE AND MICROPROCESSOR ON CARRIER INSERTABLE INTO CASING SLOT

[75] Inventors: Michel Ugon, Maurepas; Jean-Pierre Nonat, Maule, both of France

[73] Assignee: Compagnie Internationale pour l'Informatique Cii-Honeywell Bull, Paris, France

[21] Appl. No.: 648,607

[22] Filed: Sep. 7, 1984

Related U.S. Application Data

[63] Continuation of Ser. No. 546,588, Oct. 28, 1983, abandoned, which is a continuation of Ser. No. 262,606, May 11, 1981, abandoned.

[30] Foreign Application Priority Data

May 30, 1980 [FR] France ............................ 80 012109

[51] Int. Cl.³ ........................ G06F 15/16; G06F 3/00
[52] U.S. Cl. ................................. 364/900; 364/709; 235/380; 235/492
[58] Field of Search ... 364/200 MS File, 900 MS File, 364/704, 708, 709, 706; 235/379-381, 492, 382

[56] References Cited

U.S. PATENT DOCUMENTS

| | | | |
|---|---|---|---|
| 3,956,740 | 5/1976 | Jones et al. | 340/172.5 |
| 3,978,328 | 8/1976 | Fabry et al. | 234/156 |
| 4,007,443 | 2/1977 | Bromberg | 340/172.5 |
| 4,051,065 | 10/1977 | Toal | 35/30 |
| 4,053,735 | 10/1977 | Foudos | 235/61.9 |
| 4,090,247 | 5/1978 | Martin | 364/900 |
| 4,110,823 | 8/1978 | Cronshaw | 364/200 |
| 4,115,870 | 9/1978 | Lowell | 364/900 |
| 4,139,893 | 2/1979 | Poland | 364/200 |
| 4,151,596 | 4/1979 | Howells | 364/709 |
| 4,180,805 | 12/1979 | Burson | 340/709 |
| 4,201,908 | 5/1980 | Johnson et al. | 235/92 TC |
| 4,220,992 | 9/1980 | Blood | 364/410 |
| 4,279,021 | 7/1981 | See et al. | 364/900 |
| 4,316,262 | 2/1982 | Mizuta et al. | 364/900 |
| 4,348,740 | 9/1982 | White | 364/900 |
| 4,379,336 | 4/1983 | Yamamoto et al. | 364/708 |
| 4,408,119 | 10/1983 | DeCavele | 235/382 |
| 4,450,535 | 5/1984 | DePommery et al. | 364/900 |
| 4,453,074 | 6/1984 | Weinstein | 235/380 |

Primary Examiner—Raulfe B. Zache
Assistant Examiner—A. E. Williams, Jr.
Attorney, Agent, or Firm—Kerkam, Stowell, Kondracki & Clarke

[57] ABSTRACT

A portable hand-held machine M1 includes a keyboard M4, a display screen M5, a microprocessor, and a memory. The machine includes a receptacle M2, and a connector M6 to enable connection to at least one removable carrier M3 comprising a memory associated with a microprocessor M8. Circuits are provided for establishing a dialog between the machine M1 and the removable carrier M3.

9 Claims, 13 Drawing Figures

HAND-HELD PROCESSOR WITH TWO-WAY DIALOG BETWEEN MICROPROCESSOR IN CASE AND MICROPROCESSOR ON CARRIER INSERTABLE INTO CASING SLOT

This application is a continuation of prior application U.S. Ser. No. 546,588, filed Oct. 28, 1983, now abandoned, which is a continuation of U.S. Ser. No. 262,606, filed May 11, 1981, now abandoned.

The machine structure employed in embodiments of this invention employs transmission and reception devices to which a commonly-assigned U.S. patent application is directed, Ser. No. 262,607, filed May 11, 1981, by Ugon and entitled "DEVICE FOR TRANSMISSION OF SIGNALS BETWEEN TWO DATA PROCESSING STATIONS".

BACKGROUND OF THE INVENTION

The present invention relates to a portable machine for calculation or data processing.

Portable independent, and commonly electronic, machines for performing calculations or implementing functions in combination with a keyboard and a device for display of the data and results are known.

These machines are most frequently in the form of small pocket calculators, and are split into two major groups:

(1) Relatively simple machines enabling the execution of fixed programs set up during production by the manufacturer. For example, machines are currently available for performing the four basic operations of addition, subtraction, multiplication and division. Moreover, the basic functions may be accompanied by particular functions so that the machine is specialized for a given application. In particular, this is the case for mathematical or statistical functions.

(2) More complex programmable machines enabling the user himself to program the functions he requires and to store these either transiently in a provisional or temporary memory internal to the machine or on a magnetic track record carrier.

As an alternative, these machines sometimes have a passive removable device for storing specialized and fixed programs preset by the manufacturer without any possibility of development or modification by the user (e.g. Texas Instruments Model TI59).

These machines may also be equipped with an output facility leading to a hard copy printer, enabling the user to list data or programs.

For reasons of reliability and cost, all these machines are now produced based on microprocessors. In other words, they have a simplified computer structure comprising a central processing unit, a memory, and input-output channels.

The aforementioned machines have disadvantages of several kinds:

In the case of simple machines, where the instrument lacks any element for dialogue with the outside, it is impossible to secure access to personalized index cards or removable carriers, and it is impossible to implement particular functions at the user's discretion for different applications.

In the case of a programmable machine enabling the recording of programs or data on magnetic tracks, the magnetic tracks are of comparatively low capacity. Also, the magnetic track carrier is wholly passive and lacks the ability to perform functions autonomously, placing additional burden on the machine.

Furthermore, the magnetic track carrier may easily be altered or destroyed. It does not provide any security of confidentiality for the data. In also requires a comparatively expensive driving device for reading and writing.

In the case of a programmable machine having a removable carrier storing fixed programs, for practical reasons of cost and mass production considerations, they cannot be personalized.

SUMMARY OF THE INVENTION

One of the objects of the present invention is to overcome the aforesaid disadvantages by making use of a machine structure which allows connection to and two-way dialog with a removable carrier incorporating data and program storage capabilities, as well as data processing capabilities.

Such carriers and associated components are known, as for example are described in commonly-assigned UGON U.S. Pat. No. 4,211,919, issued July 8, 1980, and entitled "PORTABLE DATA CARRIER INCLUDING A MICROPROCESSOR"; and in commonly-assigned U.S. patent application Ser. No. 223,849, filed Jan. 9, 1981, by Michel UGON, and entitled "ONE CHIP MICROPROCESSOR", which is a continuation of application Ser. No. 030,548, filed Apr. 25, 1978, and now abandoned. The entire disclosures of U.S. Pat. No. 4,211,919 and application Ser. No. 223,849 are hereby expressly incorporated by reference herein. As described, these carriers may assume the form of a small card of plastics material comprising a self-programmable microprocessor and means for connection to the machine in the form of simple electric contacts.

In a first application, the machine thus constructed may in particular be utilized by private persons to consult personal card indexes, set up either by the owners of such machines or by any organization. Examples are telephone indexes, medical files, addresses, calendars, engagement books, and the like.

In a second application, the machine may be used for the insertion into the carrier of confidential data permitting access to protected items of information in the memory of the removable carrier.

In a third application, the machine makes it possible to display the state of a private financial account, for which the data has first been fed into the removable carrier by a banking or sales organization.

In a fourth application, the machine enables authorization of a person to perform particular operations, either by means of a removable authorization carrier, or by direct infeed of authorization data. Such are described in commonly-assigned U.S. patent application Ser. No. 200,785, filed Oct. 27, 1980, by Robert HERVE, and entitled "SYSTEM AND PROCESS FOR IDENTIFICATION OF PERSONS REQUESTING ACCESS TO PARTICULAR FACILITIES"; and in commonly-assigned U.S. patent application Ser. No. 235,505, filed Feb. 18, 1981, by Robert HERVE, and entitled "METHOD AND SYSTEM FOR TRANSMISSION OF CONFIDENTIAL DATA"; the entire disclosures of which are hereby expressly incorporated by reference.

In a fifth application, the machine makes it possible to record programs in the removable carriers, personalized at the discretion of the user or manufacturer, in such manner as to establish specialization of the machine, with no other restriction than that of the size of the programs which are to be recorded.

BRIEF DESCRIPTION OF THE DRAWINGS

The invention will now be further described by way of example, with reference to the accompanying drawings, in which.

DESCRIPTION OF THE PREFERRED EMBODIMENTS

Figure 1:
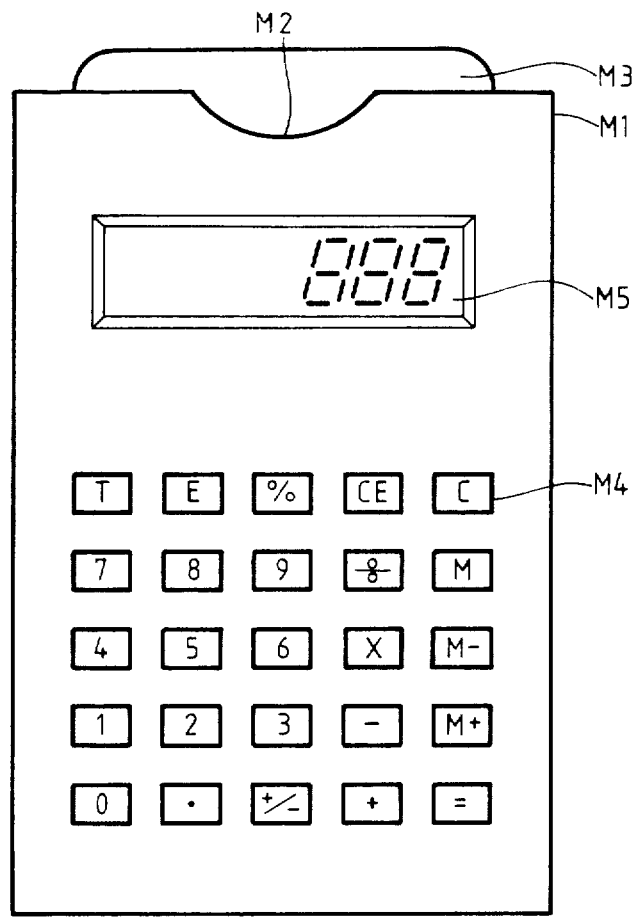
FIG. 1 shows the front face of the machine.

FIG. 1 depicts one of the embodiments of the machine.

The machine is contained within a metal, plastic or other case M1, such as are normally used for small hand-held pocket calculators. This case is provided with a slot M2 making it possible to insert a removable carrier M3 into the machine. As previously indicated, removable carrier M3 is preferably a portable data carrier in the form of a small plastic card embodying therein a microprocessor and a memory, such as described in the afore-referenced U.S. Pat. No. 4,211,919. The items of information and data are fed in by means of keyboard M4 comprising a number of movable keys, including function keys T and E shown in FIG. 1.

In a financial application, for example, the function key T allows of direct display of the balance, and the function key E renders it possible, by repeated actuations, to show consecutive displays of the different amounts of the transactions entered.

The machine is equipped with a display device M5 which may be numeric or alphanumeric, the technology of which is well known to those skilled in the art.

Figure 2:
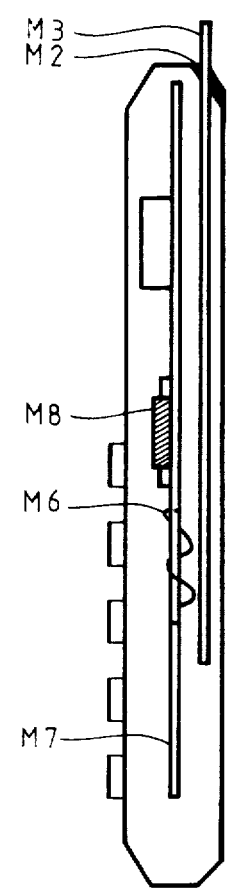
FIG. 2 shows a cross-section of the machine into which a removable carrier has been inserted.

The slot M2 enables the insertion of the removable carrier into the machine (as best seen in FIG. 2), and the guiding of the same until electrical connection is established via a contact block M6 previously inserted and connected to the basic printed circuit board M7 of the machine.

This printed circuit board M7 carries all the electronic components of the machine, in particular a microprocessor M8.

Figure 3:
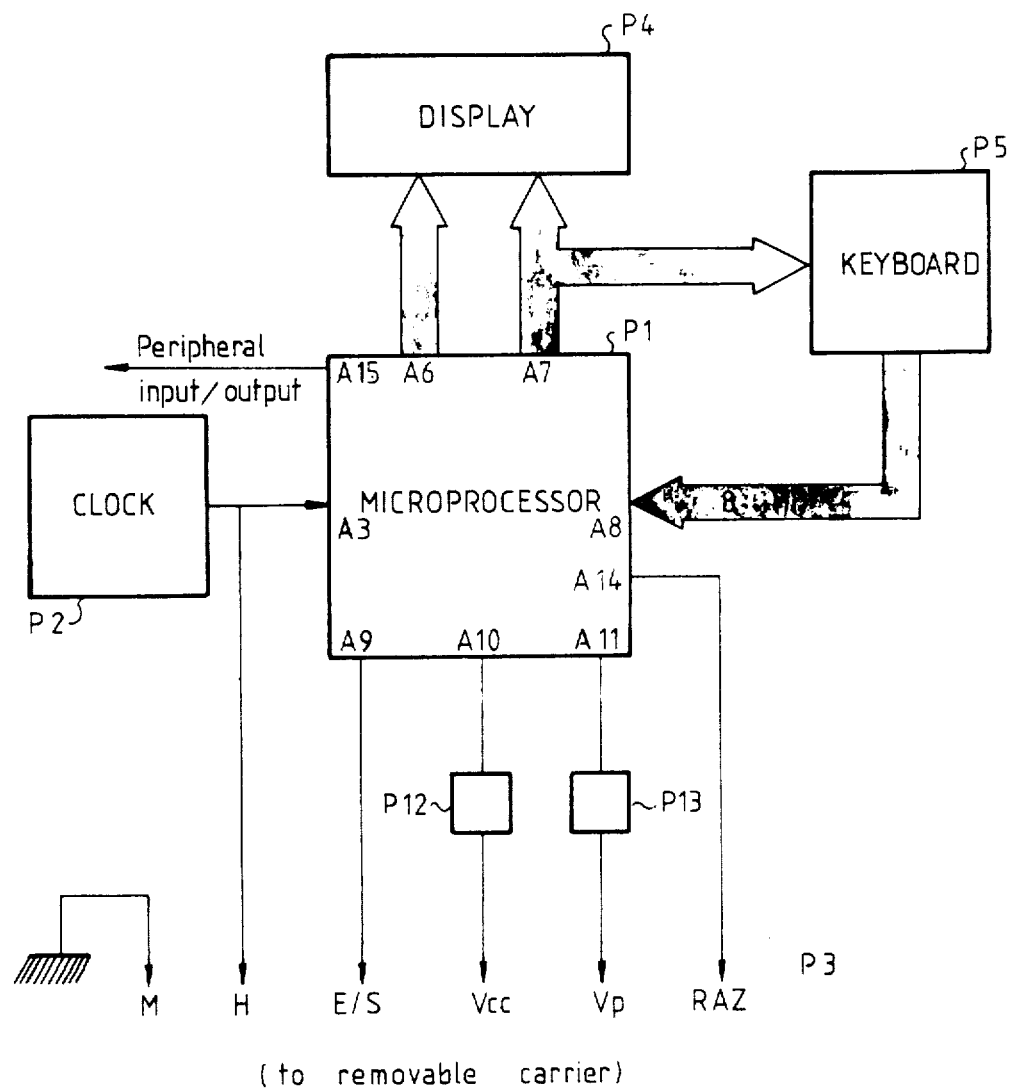
FIG. 3 shows a functional block diagram of the machine.

FIG. 3 shows the operational block diagram of the machine. It comprises a microprocessor or processing element P1 timed by a clock P2, clock pulses H from which are also available to the removable carrier M3 via the connection P3.

The microprocessor P1 in a conventional manner simultaneously provides for management of a display element P4 and of a keyboard P5 via three sets of input-output lines A6, A7 and A8:

Lines A6 select the segment among the points displayed of a given character.

Lines A7, which operate synchronously, provide character scanning and keyboard scrutiny.

Lines A8 are for reading the keyboard P5.

The microprocessor P1 is programmed to eliminate interference and double actuations of the keyboard.

Furthermore, a two-way input-output port A9 enables a synchronous dialog with the removable carrier M3.

The carrier M3 is energized via a port A10 and a control circuit P12.

When the machine intends to write in the memory of the removable carrier M3, it delivers the write voltage Vp via a port A11 and a control circuit P13.

A direct actuator A14 assures a correct zero reset of the carrier M3 prior to the dialog.

The port A15 provides connections between the microprocessor P1 and peripherals external to the machine.

The processing elements of the removable carrier M3 and of the machine comprise microprocessors which together make it possible to carry on a dialog between the removable carrier M3 and the machine, as well as to perform independent processing operations in the carrier M3 and in the machine. Thus, the infeed of a password by means of the keyboard M4 directs the removable carrier M3 to yield free access to the data or other information requested by the machine. The data processor of the machine may directly implement programs stored in the removable carrier M3, so as to perform within the machine functions depending on data contained in the removable carrier M3. Results of programs stored and executed within the removable carrier M3 may be processed by the machine so as to perform functions depending on the carrier M3 utilized.

In the case where the removable carrier endows the machine with specific functions, it is possible to equip the machine with a cache-memory carrying entries which make it possible to interpret the display and to invest the keys of the keyboard with special meanings.

Finally, it is possible to enable the machine to operate with particular carriers M3. For example, in accordance with the teachings of the above-identified commonly-assigned HERVE application Ser. No. 235,505, the machine may actually read an identification code from the carrier M3 memory and calculate a function R of the identification code and of a secret code S. The same calculation may be performed within the carrier M3. Upon completion of the processing operations, the machine may compare the functions R calculated simultaneously in the carrier M3 and in the machine. If the results are equal, the machine may draw the conclusion that it is authorized to work with the carrier M3. Consequently, all the data coming from or going to the removable carrier M3 may be processed by the microprocessor of the machine.

The dialog between the removable carrier M3 and the machine will now be described with reference to FIGS. 4 through 12.

Figure 4:
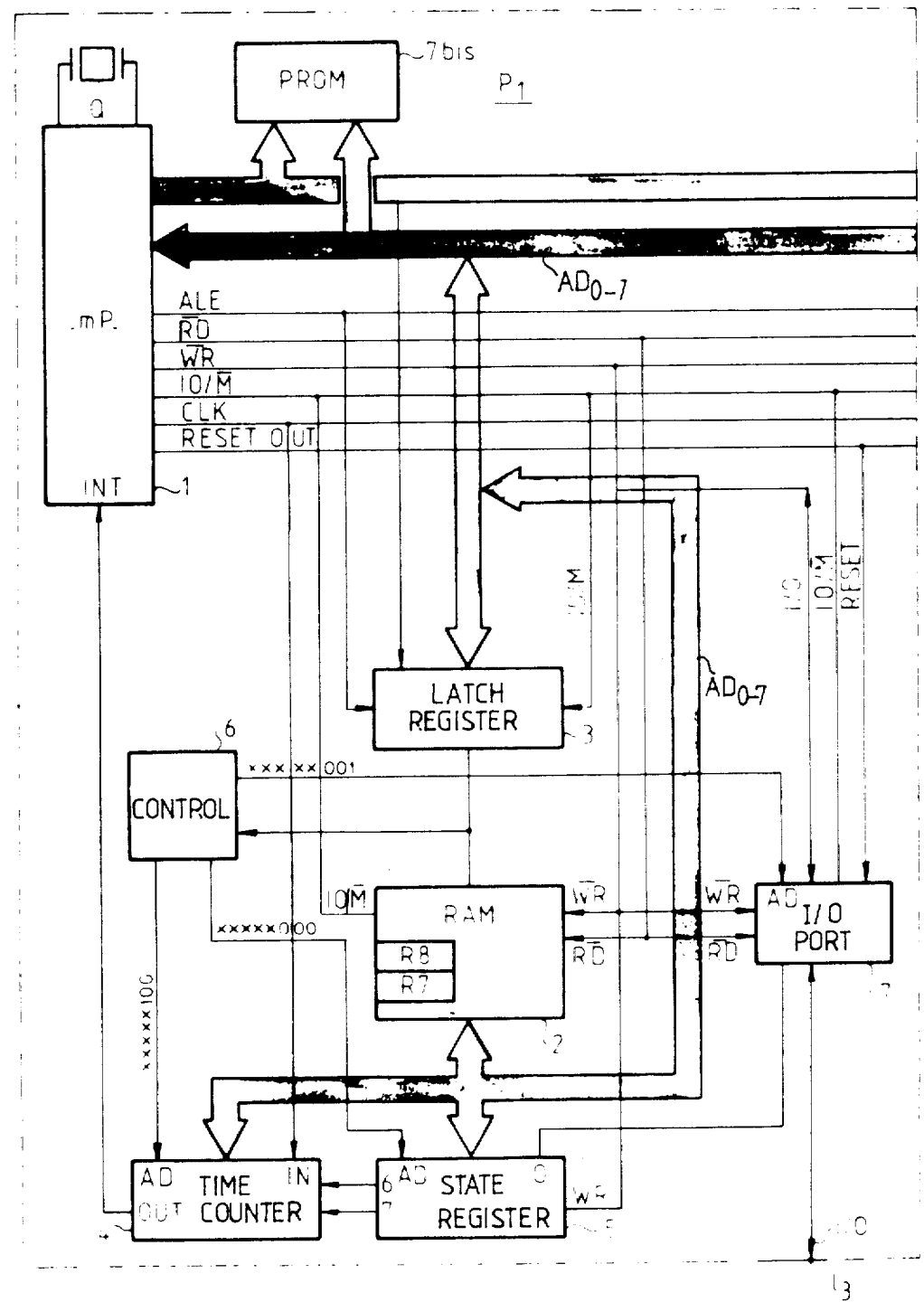
FIG. 4 is an illustration of the transmission and reception device included in both the machine and the removable carrier for dialog between the machine and the removable carrier.

FIG. 4 illustrates the transmission and reception device utilized both in the removable carrier M3 and in the machine. It comprises at least one microprocessor 1 associated with elements for controlling the input and output of the data entering or leaving the device. These elements include a storage device 2 in the form of a Random Access Memory (RAM), a lock or latch register 3, a time counter 4, a state register 5, a control circuit 6, a Programmable Read Only Memory (PROM) 7', and a bidirectional transceiver or port circuit 7 connected to the data line l3 for transmission and reception of data. The control circuit 6 is described in detail hereinbelow with reference to FIG. 7, and the port circuit 7 is described in detail hereinbelow with reference to FIG. 6. The microprocessor 1 may be a microprocessor Type No. 8080 or 8085 sold by the INTEL Corporation, and others. This microprocessor 1 may be connected to elements other than those illustrated in FIG. 4, via its address lines $A_{8-15}$ and data lines $AD_{0-7}$.

The eight data lines $AD_{0-7}$ are connected to the input terminal of the latch register 3 for addressing the random access memory RAM 2.

This memory RAM 2 for example has a capacity of 2K bits organized into 256×8 bits. It contains a register R7 to record the octet transferred via the port 7, and a register R8 for recording the parity bit corresponding to the octet transferred.

By the state of its outputs, the latch register 3 also selects the control circuit 6.

The control circuit 6 selects the port circuit 7 for transmission and reception of data when the binary pattern stored in the latch register 3 is XXXXX001. It selects the state register 5 when the binary pattern in the register 3 is XXXXX000. Finally, it selects the time counter 4 when the binary pattern in the register 3 is XXXXX100.

The time counter 4 has its inputs connected in parallel to the data lines $AD_{0-7}$ in such manner that it may be loaded at any instant with an initial time value by the microprocessor 1.

The state register 5 is also connected to the lines $AD_{0-7}$ in order to enable the same to store an instruction issued by the microprocessor 1. This is a register comprising eight flip-flops whose states enable the selection of either the input/output port circuit 7 or the time counter 4.

The line ALE connects the microprocessor 1 to the latch register 3 and carries the blocking signal to latch register 3 so as to give or refuse authorization to address the memory RAM 2 and the control element 6.

A line IO/$\overline{M}$ selects either the memory RAM 2 or the input-output circuit 7. The lines $\overline{RD}$ and $\overline{WR}$ control the read-write operations and are connected to the appropriate control circuits of the memory RAM 2 and of the port circuit 7.

The microprocessor 1 is synchronized by a clock Q comprising a quartz crystal. It transmits clock signals on the line CLK to the input IN of the time counter 4. The RESET OUT line is connected to the input of the port circuit 7 and enables initialization of the system into the input-output mode.

The microprocessor 1 is also connected via its data and address lines to the read-only memory 7' in which are entered the microprograms needed for transmission and reception of data by the removable carrier M3 or the machine.

The processing element of the machine and processing element of the removable carrier M3 each comprise a set of devices such as are described above with reference to FIG. 4.

Figure 5:
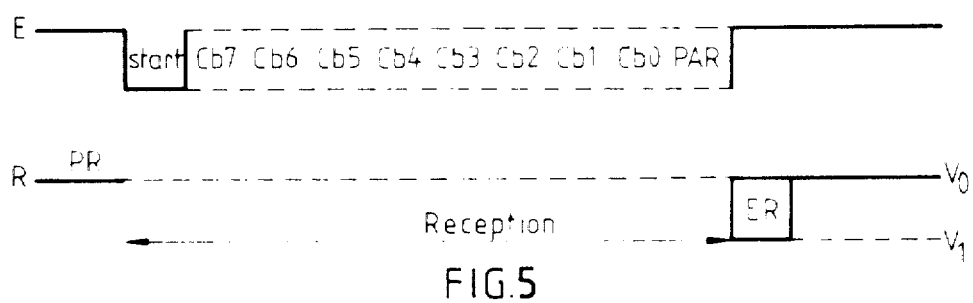
FIG. 5 is a timing diagram corresponding to the transmission of a message comprising one octet between the machine and the removable carrier.

FIG. 5 illustrates the chronological sequence of a message transmitted on the data line l3 in bit serial form. The transmission of a message comprising an octet (eight bits) occurs over ten intervals. The first interval is utilized to transmit the message START signal (START bit). The second through ninth intervals are utilized for transmission of the message as such (Cb7 through Cb0). The parity bit (PAR) is transmitted during the tenth interval.

The receiver receives the signals transmitted during these ten intervals and performs a parity check during an eleventh. The receiver signals the transmitter that it is ready to receive a message by placing the data line l3 at a potential $V_0$ (signal PR). This signal PR occurs at least one interval prior to the transmission of the START bit. After reception and verification, if the parity check carried out on the message discloses that there was an error, the receiver places the line l3 at a potential $V_1$. If there is no parity error, indicating correct transmission and reception, the line l3 is returned to the initial potential $V_0$.

The eight bits comprising an octet are transferred in sequence on the conductor l3 and are stored successively in the register R7 of the memory RAM 2.

This transfer is performed by successive reading of the port 7, successive transfer into the accumulator register of the receiving microprocessor, and transfer following alignment of the accumulator register into the register R7 of the memory RAM 2. Upon transfer of each new bit, a parity bit is calculated whilst making allowance for the parity of the bits already received. The result of the parity calculation is transferred into the register R8 of the memory RAM 2. The end of message bit which also acts as a parity bit for the message transmitted is compared with the parity bit calculated and stored in the register R8. The transmission is accepted as correct if the two bits are of equal value. If they are not, this anomaly is reported to the transmitter by transmission of the signal ER from the receiver.

Figure 6:
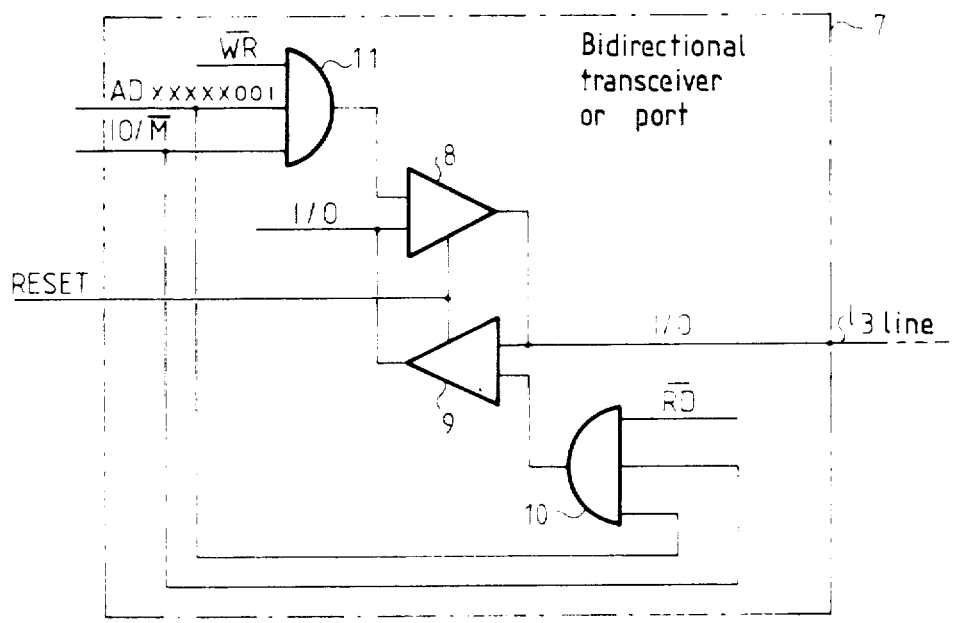
FIG. 6 shows a bidirectional transceiver circuit employed as a port for the transmission of messages between the machine and the removable carrier.

FIG. 6 shows in detail the bidirectional transceiver or port circuit 7 of FIG. 4. This transceiver circuit 7 comprises tri-state output amplifiers 8 and 9 controlled by respective control gates 10 and 11. The output of the amplifier 8 is connected to the input of the amplifier 9. These two amplifiers 8 and 9 are connected to the line l3 in such manner that the amplifier 8 may be utilized to transmit data (I/O) on the line l3 and the amplifier 9 to receive the data (I/O) from on the line l3.

The gate 11 controls the amplifier 8 when it is selected both by the pattern XXXXX001 received from the control circuit 6, by the line IO/$\overline{M}$, and by a write instruction WR transmitted by the microprocessor 1. Similarly, the gate 10 controls the amplifer 9 when it is selected by the pattern XXXXX001, by the line IO/$\overline{M}$, and by a read instruction transmitted by the microprocessor 1. The amplifiers 8 and 9 are initialized by means of the RESET signal.

Figure 7:
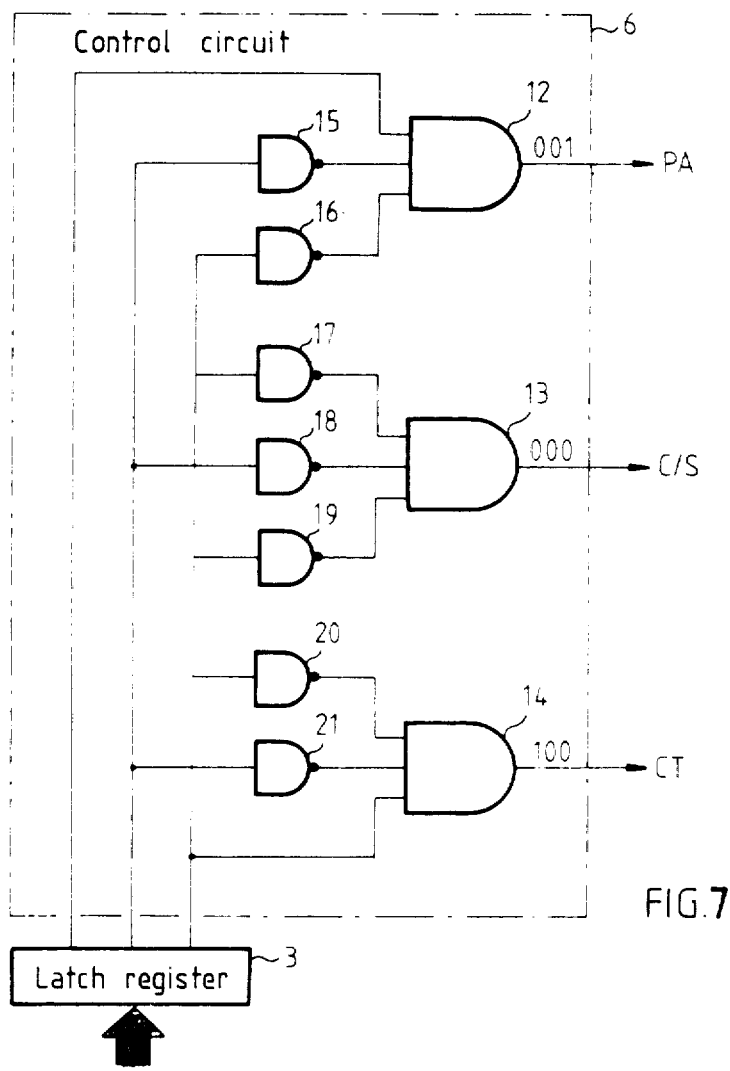
FIG. 7 is an illustration of the control circuits of FIG. 4.

The FIG. 4 control circuit 6 is illustrated in detail in FIG. 7. This circuit is for decoding data contained in the FIG. 4 latch register 3. AND gate 12 and inverters 15 and 16 decode the address signal XXXXX001 to select the transceiver circuit 7. AND gate 13 and inverters 17, 18 and 19 decode the address signal XXXXX000 to select the state register 5. AND gate 14 and inverters 20 and 21 decode the address signal XXXXX10 to select the time counter 4.

Figure 8:
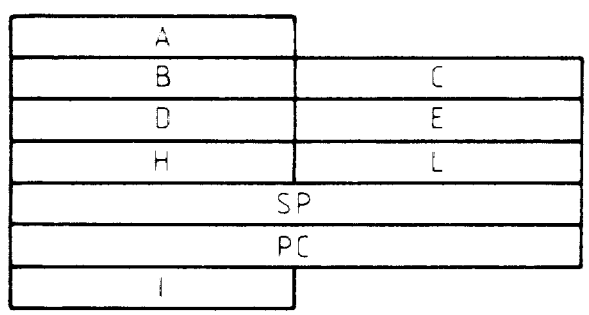
FIG. 8 is an illustration of the working registers of an 8080 microprocessor CPU, sold for example by the INTEL Corporation, which may be employed in embodiments of the transmitters/receivers in accordance with the invention.

FIG. 8 provides an illustration of the working registers contained in a microprocessor CPU of the 8080 or 8085 type.

Register A is the accumulator. Registers B, C, D, E are working registers and are adapted to receive data. Registers H and L are address registers. Register SP (Stack Pointer) contains the address of a cell register and is utilized during interrupt to point to the address of a memory location to save the contents of particular registers of the microprocessor or to resume interrupted processing operations. Register PC is the Program Counter and allows the passing to the next instruction during execution of a program. The register I is an Index register which enables data addressing by indexing.

The details relating to the functionality of these registers are given in the book entitled "Les microprocesseurs" by Pierre Le Beaux and Rodnay Zaak, published by the publishing company Sybex-313 rue Lecourbe 75015 PARIS-C 1977.

Figure 9:
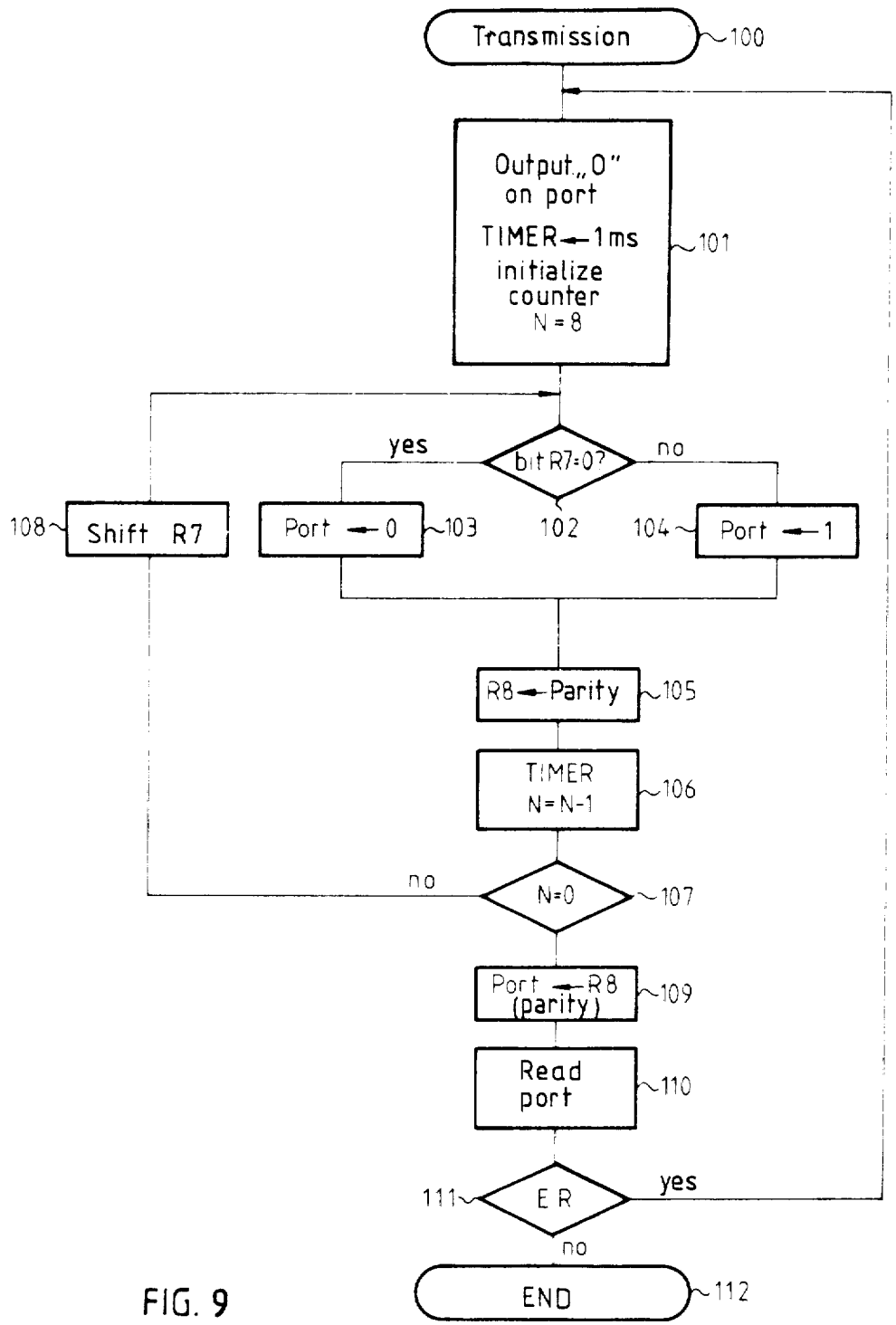
FIG. 9 is an exemplary flowchart depicting a suitable microprogram for data output on the transmission line.

The flowchart of FIG. 9 illustrates the different steps necessary to execute the microprogram for a transmitting microprocessor, beginning at Step 100.

During Step 101, the transmitting microprocessor sets the connecting line $l_3$ to the logic state "0" and loads the time counter 4 with the bit time (1 ms) required for bit serial transmission of the START bit and the following octet in the manner illustrated in FIG. 5, and initializes N=8 for the eight bits of the octet.

The end of the START bit occurs when the time counter 4 interrupts the microprocessor 1. At step 102, the octet which is to be transferred, contained in the register R7 of the memory RAM 2, is loaded into the accumulator register A of the microprocessor 1 to test the value of the first bit.

Depending on this value, either Step 103 or Step 104 is entered to transmit the corresponding value of the first bit read in the register R7 on the conductor $l_3$.

During Step 105, the parity bit corresponding to the message which is to be transmitted is calculated and transmitted into a bit position of the register R8 of the memory RAM 2.

In Step 106, N is decremented. If N is not yet zero, the program loops back, through Step 108.

During Step 108, the content of the register R7 is shifted to the left by one binary position.

This process repeats at each interrupt caused by the time counter 4, and is completed when all the bits of the octet have been delivered successively.

Step 107 checks that all bits have been transferred.

During Step 109, the parity bit stored in the register R8 is transferred in its turn. The receiver may then calculate the parity of the bits of the octet received, and compare the calculated parity bit with the received parity bit.

The transmission cycle is completed in case of coincidence (Step 112). In the absence of coincidence, the receiver signals the presence of an error to the transmitter (signal ER, FIG. 5) and another transmission cycle is performed starting at Step 101.

Figure 10:
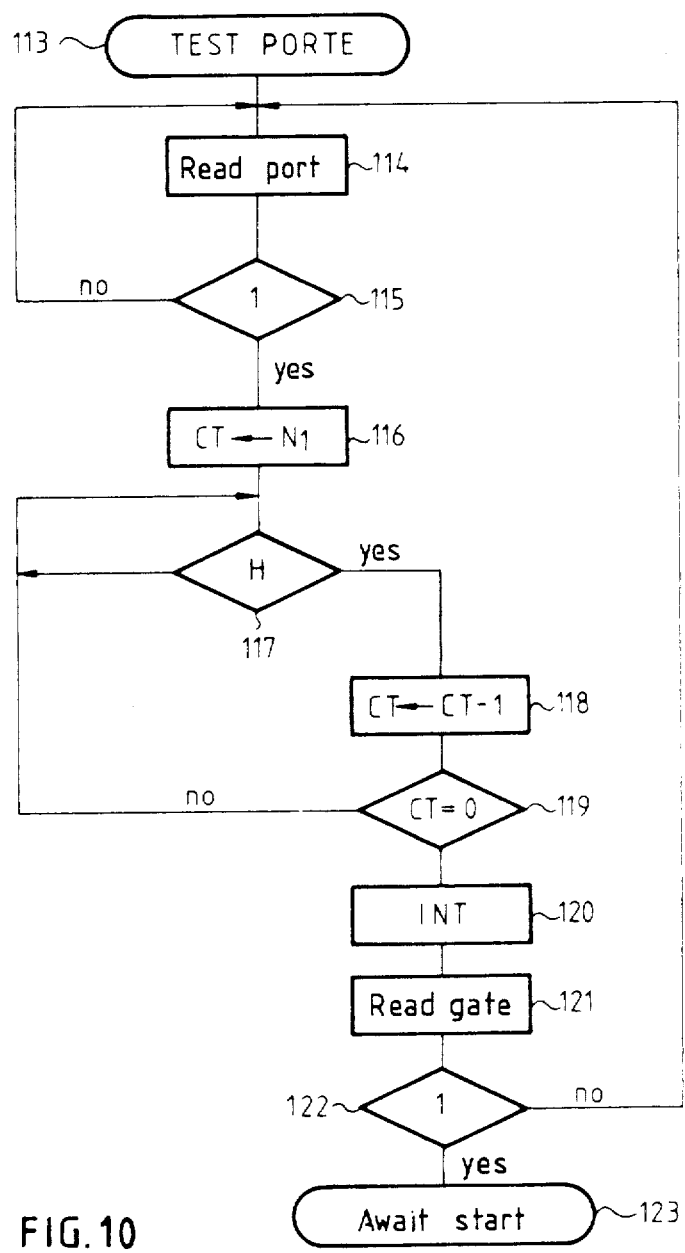
FIG. 10 is an exemplary flowchart depicting a suitable microprogram for testing the state of the transmission line between two transmissions.

FIG. 10 is a program flowchart beginning at Step 113 showing the operations performed by the receiver when it is on standby (ready), waiting for a message coming from the transmitter. These tests are performed by repeated read operations of the logic state of the transmission line $l_3$.

During Step 114, the port 7 is read repeatedly in a loop while the logic state of line $l_3$ is at "0".

When the state of the line changes to logic "1" (Step 115), the time counter 4 is loaded to a predetermined time value (Step 116), in such manner as to cause a microprocessor interrupt and to cause the logic state of the port 7 to be read when this time value is exhausted.

This test occurs during Step 122. If, during this step, the logic state of the port 7 is "1", the receiver is placed in readiness for the START signal. If, on the contrary, the logic state of the port 7 is "0", it is inferred that the test performed during Step 115 had taken place on noise or other interference, and the receiver is then returned to Step 114.

Figure 11:
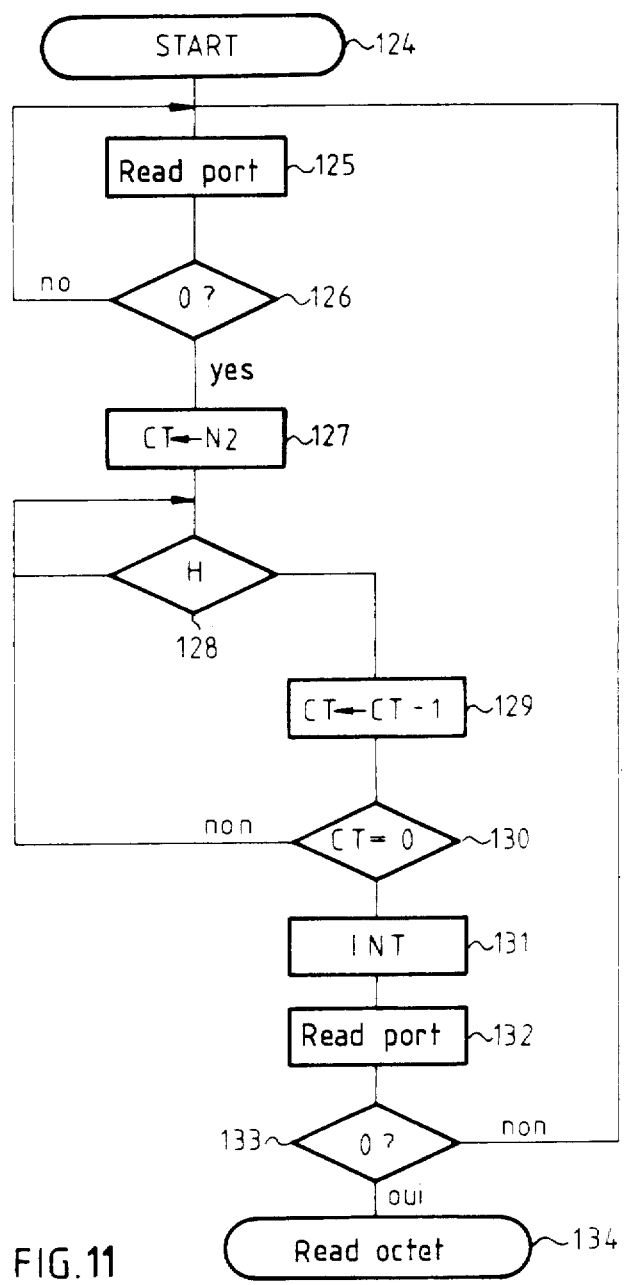
FIGS. 11 and 12 are exemplary flowcharts depicting the microprograms for reading data transmitted by the transmitter and received by the receiver.

FIG. 11 is a program flowchart showing the sequence for reception of the START signal or bit, beginning with step 124.

During Step 125, the receiver reads the logic state of the port 7.

At Step 127, the time counter 4 is loaded to a predetermined time value $N_2$ as soon as the conductor $l_3$ assumes the logic state "0", as tested in Step 126.

This time value is decremented during Step 129 at the rate of the internal clock of the microprocessor until it reaches zero (Step 130).

The time counter 4 reaching zero causes an interrupt of the microprocessor, which then performs a read operation on the port 7 (Step 132).

If the conductor $l_3$ still has the logic state "0", there is confirmation that the signal in question is an actual START signal, and not a noise or interference signal. The octet reading operation of FIG. 12 (beginning at Step 134) may then be performed.

Figure 12:
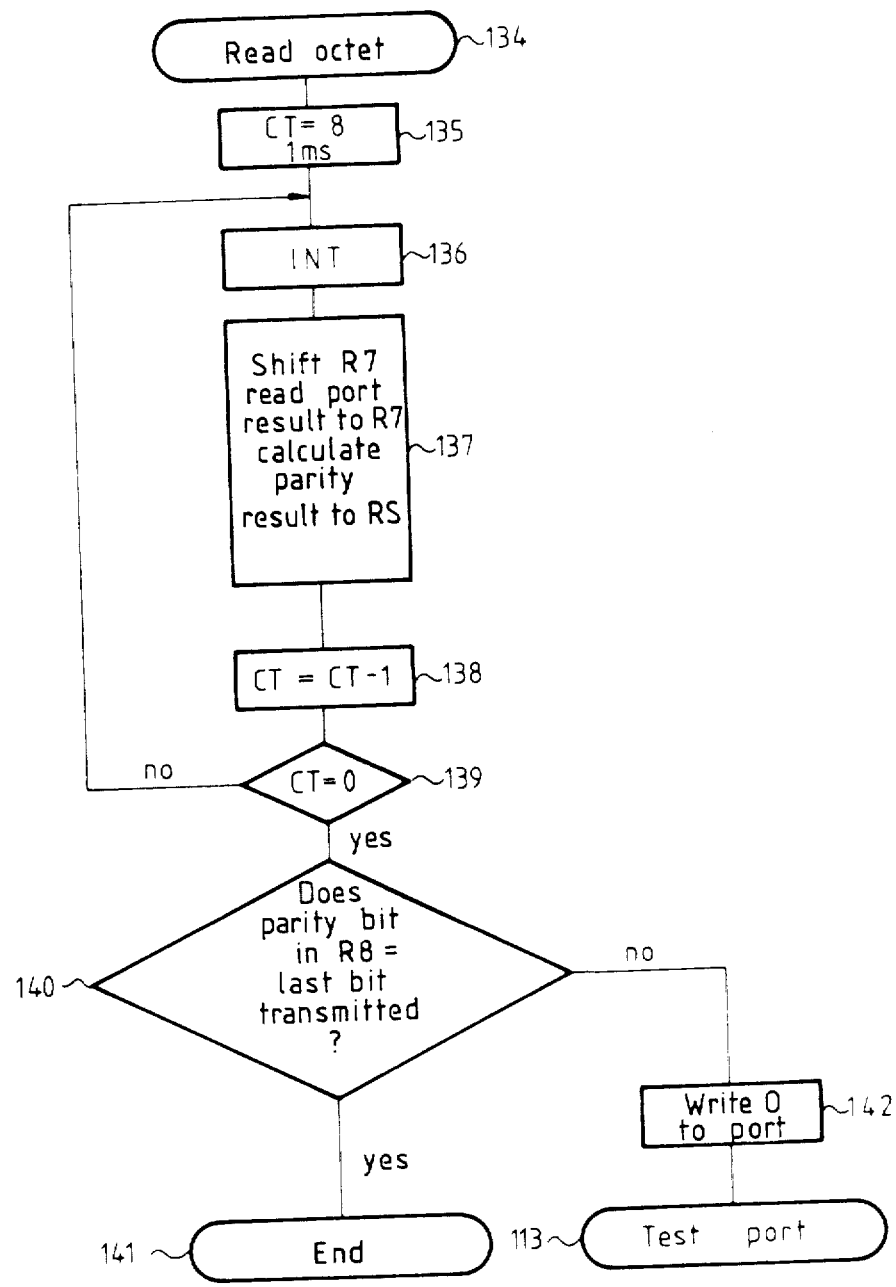

FIG. 12 is a flowchart showing the octet read sequence, beginning with Step 134.

In Step 135, the time counter 4 is loaded to a time value corresponding to the period needed to read the eight bits transmitted. For example if the period of each bit is 1 ms, the value of the transmission time loaded into the time counter 4 is 8 ms.

Each transfer of a bit causes an interruption of the receiving microprocessor (Step 136) to authorize the latter, in Step 137, to store the bit read on port 7 in the register R7, to perform a parity calculation on the bits already received with regard with that just received, and to load the parity calculation result into the register R8.

When an octet has been transferred into the register R7, the time counter 4 reaches the zero state simultaneously with reception of the parity bit transmitted by the transmitter.

In Step 140, a comparison is then made between the bit transferred by the transmitter and the bit previously calculated and stored in the register R8 of the receiver. If there is correspondence between the two parity bits, the transmission has occurred without error and is considered as being completed (Step 141). If, on the contrary, the two parity bits are different, there is a transmission error, and this error is reported to the transmitter at Step 142 by writing a logic state "0" on the port connected to the line $l_3$. The sequence for testing the state of the port 7 is then resumed (Step 113).

The program sequences which have been described with reference to the flowcharts of FIGS. 9, 10, 11 and 12 may be performed by means of the following specific exemplary instructions stored in the FIG. 4 PROM memory. The instruction set is that of the INTEL 8080 CPU.

| Instructions | Remarks |
|---|---|
| | TRANSMISSION |
| 100 OUT PA | Port A ← 0 |
| 101 LHLD | |
| 102 MOV A,M | (initialization of the time counter) |
| 103 MOV CT, A | CT ← A |
| 104 LHLD | |
| 105 MOV B,M | B ← 0 |
| INT | (time counter interruption) |
| 106 LDA | A ← 8 |
| 107 SBB B | |
| 108 JZ NEXT (114) | |
| 109 LDA | A ← R7 |
| 10A OUT Port A | |
| 10B MOV C,A | C ← A |
| 10C ANA | mask 1 000 000 |
| 10D XRA,M | parity calculation A $A_0 \leftarrow R8 + A_0$ |
| 10E LHLD | |
| 10F MOV M,A | parity in R8 |
| 110 MOV A,C | A ← R7 |
| 111 RLC | shift R7 |
| 112 MOV M,A | R7 ← A |
| 113 RET | |
| 114 LDA | A ← R8 |
| 115 OUT Port A | |
| 116 NOP | |
| 117 IN Port A | |
| 118 CPI | if 1 = error |
| 119 JNC NEXT (100) | |
| 120 RET | End |
| | TEST PORT |
| 11A IN Port A | $A_0 \leftarrow$ state of Port 7 |
| 11B CMP M | Compare $A_0$ to 1 and make S = 1 in PSW if ≠ |
| 11C RM NEXT = (11A) | If S = 1 return to 11A |
| 11D LHLD | load H,L with memory contents present at address gg and PP. A ← N |
| 11F MOV CT,A | CT ← N |
| 120 RET | |
| | START |
| 121 IN Port A | |
| 122 CMP M | Make S ← 1 in PSW if ≠ |
| 123 RM NEXT (121) | Return to 121 if S = 1 |
| 124 LHLD | |
| 125 MOV A,M | . . |
| 126 MOV CT,A | |
| 127 RET | |
| | INT. START |
| 128 PUSH PSW | Save A and PSW |
| 129 IN Port A | |
| 12A CMP M | Make Z = 0 of PSW if gate = 0 |
| 12B RM NEXT (128) | If Z = 1, return to 128 |
| 12C CNZ Read Octet | |
| | READ OCTET |
| 12D LHLD | |
| 12E MOV A,M | |
| 12F MOV CT,A | |
| 130 LXI B | B ← 0 |
| 131 RET | |
| INT | |
| 132 LHLD | |
| 133 MOV A,M | |
| 134 RLC | |
| 135 MOV D,A | |
| 136 IN Port A | |
| 137 MOV E,A | |
| 138 LHLD | Addressing of R8 |
| 139 XRA | Parity in A |
| 13A MOV M,A | Parity in R8 |
| 13B MOV AE | |

-continued

| | |
|---|---|
| 13C ORA D | |
| 13D LHLD | Addressing of R7 |
| 13E MOV M,A | R7 ← A |
| 13F INX B | |
| 140 LDA | A ← 8 |
| 141 SBB B | |
| 142 JP | Z ← 1 of PSW upon = 0 |
| 143 RET | |
| 144 MOV A,E | |
| 145 LHLD | Addressing of R8 |
| 146 CMP M | |
| 147 JZ NEXT (149) | Make Z = 1 of PSW if equality |
| 148 End | |
| 149 OUT Port A | |
| 150 CALL Port Test | |

In the embodiment which has been described, the structure of the data transmitted or received is based on the octet. It will be appreciated, however, that this structure may be of any nature and may be enlarged to a greater number of bits.

The octet contains instructions, data or addresses. These two kinds of information are multiplexed in time on the line. In case of a transmission error, the transmitter will again dispatch the information for which a transmission error occurred. In principle, a single repeat attempt is made prior to zero reset and subsequent dialog resumption.

The dialog is governed by a series of operating codes or orders which are received and interpreted by the receiver to assure dialog security and synchronization of the two units. Security is secured by sending a significant data item back to the transmitter, if possible.

When the removable carrier M3 performs a processing operation, the machine awaits the signal denoting the end of the processing operation, and vice versa.

Apart from a processing step, the removable carrier M3 is always in readiness for an order.

The logic dialog may be divided into three phases.

The first phase comprises the transmission of an "operating" code of a length of eight bits, which is characteristic for the processing operation which is to be performed. This "operating" code is followed by a read or write address in the memory of the removable carrier. This phase is completed by the return transmission of the same operating code.

The second phase covers either the exchange of data in the write or read mode, or a specific action by the removable carrier M3. In case of a data transfer, the two sub-assemblies may be cognizant of the precise number of octets which are to be exchanged.

The third phase denotes that the removable carrier M3 has completed the processing operation requested and specified in the operating code of the first phase. It comprises an END code followed by a state word characteristic of the processing operation.

The transmission of the successive octets constituting the first, second and third phases can be carried out with the aid of microprogrammable members already described previously.

Figure 13:
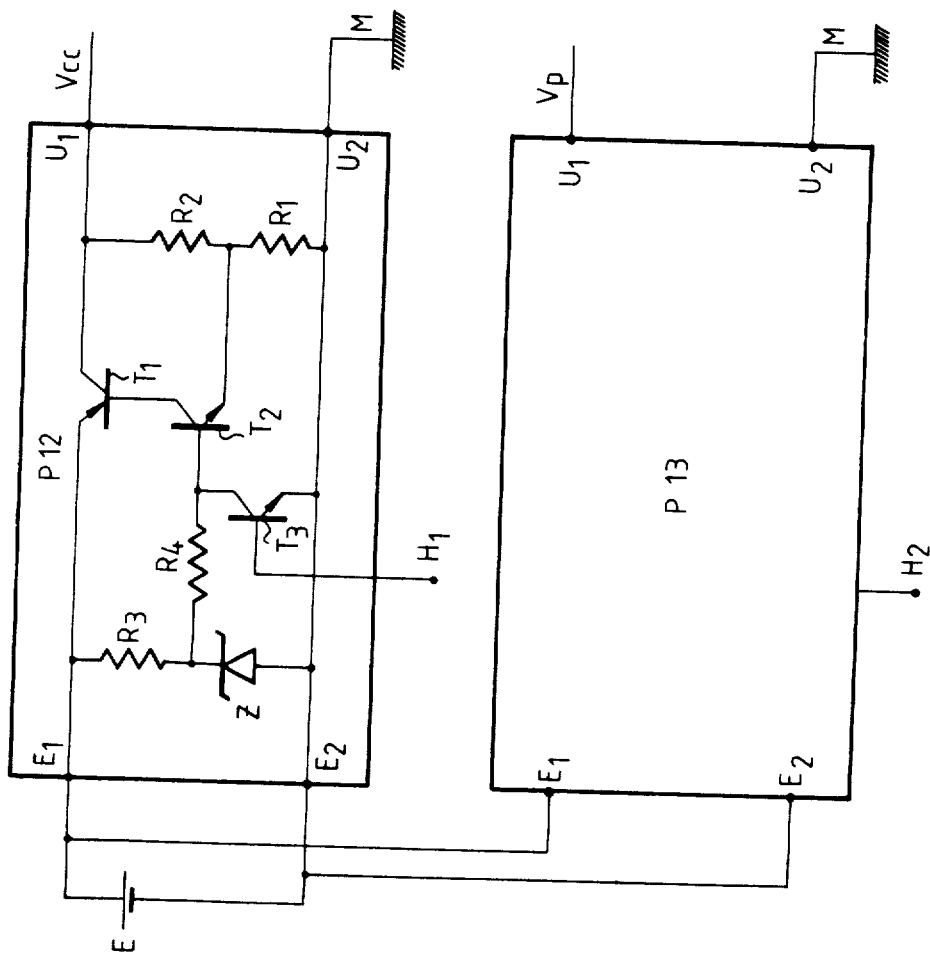
FIG. 13 is an illustration of suitable power supply circuits P12 and P13.

FIG. 13 shows the power supply for the removable carrier P3 from the current and voltage sources P12 anu P13.

Each Block P12 and P13 is itself supplied from a battery E which could advantageously be replaced by an external mains supply provided with a device for rectifying alternating current. The battery E is connected across the terminal $E_1$ and $E_2$ of the circuits P12 and P13. Each of the circuits P12 and P13 comprises transistors $T_1$, $T_2$ and $T_3$. The transistor $T_1$ is driven at its base by the collector of the transistor $T_2$. The emitter of the transistor $T_1$ is connected to the input terminal $E_1$ of the circuit and its collector delivers the voltage $V_{cc}$ with respect to the earth M of the circuit. A proportion of the voltage $V_{cc}$ is applied to the emitter of the transistor $T_2$ by the voltage divider formed by the resistors R1 and R2 arranged as a potentiometric divider between the point $U_1$ and the earth M of the circuit. A stable voltage delivered by a Zener diode Z is fed to the base of the transistor $T_2$ via the resistor $R_4$. The Zener diode is fed with the battery voltage E via the resistor $R_3$. The layout is such that the output voltage supplied by the circuits P12 and P13 is proportional to the voltage present across the terminals of the Zener diode Z, the proportionality ratio being $(R_2+R_1)/R_1$. The transistor $T_3$, upon being activated on its base by the signal $H_1$ and $H_2$, makes it possible to short-circuit the base/emitter junction of the transistor $T_2$ and thus offers the possibility of obtaining a zero voltage at the output side of the circuits P12 and P13.

These features make it possible on the one hand to supply the removable carrier at any instant following its connection to the machine. Apart from supplying the voltage $V_{cc}$ to the microprocessor of the removable carrier, they also make it possible to supply a voltage $V_p$ needed to write data into the memory of the removable circuit, at the time required.

The example which has been given of a preferred embodiment of the invention is not restrictive in any way. It is obvious that any one versed in the art who is well acquainted with data processing techniques will be able to envisage other embodiments of the invention without thereby exceeding its scope.

What is claimed is:

1. A portable hand-held data processor comprising a case sized to enable the case to be hand-held, the case having thereon a keyboard for manual data entry and a display, and having a slot therein for receiving a removable carrier; first processing means including a first microprocessor and a first memory disposed within the case and connected to the keyboard and to the display for performing a first predetermined set of data processing operations; a removable carrier received within the slot and releasably connected electrically to the first processing means, the removable carrier comprising a card embodying therein second processing means including a second microprocessor and a second memory for performing a second predetermined set of data processing operations; and means for the bidirectional transmission of messages in bit serial form between the first and second processing means by variations of a signal on a single conductor line connecting the first processing means to the second processing means of the removable carrier received in the slot, the first and second memories embodying programs for controlling the first and second microprocessors so as to afford bidirectional communication therebetween over said single conductor line and to expand the data processing capability of the portable data processor to enable the portable data processor to perform both said first and second predetermined sets of data processing operations.

2. Portable data processor according to claim 1, wherein the first processing means and the removable carrier are each capable of functioning as a transmitter as well as a receiver.

3. A portable data processor according to claim 2, wherein said messages comprise connection orders and coded data sent between the transmitter and receiver and state reports and coded data sent between the receiver and the transmitter.

4. A portable data processor according to claim 1, wherein the display comprises a numeric or alphanumeric display, and means for displaying data calculated or processed by the first and second processing means.

5. A portable data processor according to claim 1, wherein the second processing means comprise means for processing data or programs contained in the memory of the removable carrier co-operating with the fourth means for two-way dialog.

6. A portable data processor according to claim 1, wherein the first processing means comprising means for transmitting to the removable carrier a password enabling free access by the first processing means to the data or programs in the second memory.

7. Portable data processor according to claim 1, wherein the first processing means comprises a means for processing data and executing programs contained in the second memory of the removable carrier so as to perform within the first processing means functions depending on the contents of the second memory.

8. A portable data processor according to claim 1, further comprising means for data transmission and reception connected to an external peripheral device.

9. A portable data processor according to claim 1, wherein said bidirectional transmission means comprises first and second circuits for respectively connecting said first and second processing means to the single conductor line, each circuit being controlled by its associated processing means and including first means for placing the line in a first predetermined state to indicate that its associated processing means is in a reception mode and is ready to receive a message; second means, operative when the processing means is in a transmission mode, for detecting the line being in the first predetermined state; third means responsive to the second means detecting said first predetermined state for generating and transmitting over the line a message preceded by a start bit; fourth means, operative in the transmission mode, for calculating from the transmitted message a first parity bit and for transmitting the first parity bit over the line; fifth means, operative in the reception mode, for calculating a second parity bit from the received message and for comparing the first and second parity bits; and sixth means responsive to the fifth means for placing the line in a second predetermined state upon a difference between the parity bits being detected to indicate that a transmission error has occurred.

* * * * *